Figure 4:
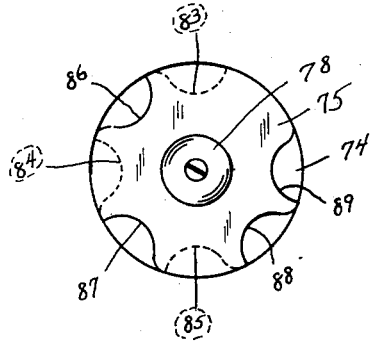

Dec. 12, 1933.  J. T. RUCH  1,938,863
PRODUCTION CONTROL FOR DOUGHNUT MACHINES AND THE LIKE
Filed July 21, 1932  3 Sheets-Sheet 1
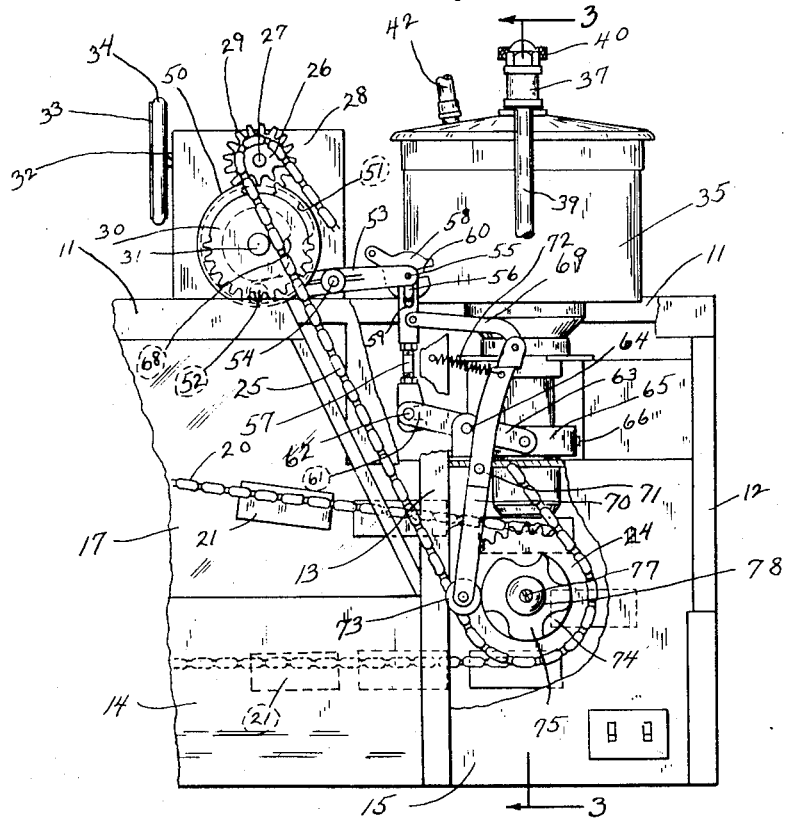
INVENTOR.
JULIUS T. RUCH
BY Lockwood Lockwood
Goldsmith & Galt
ATTORNEYS.

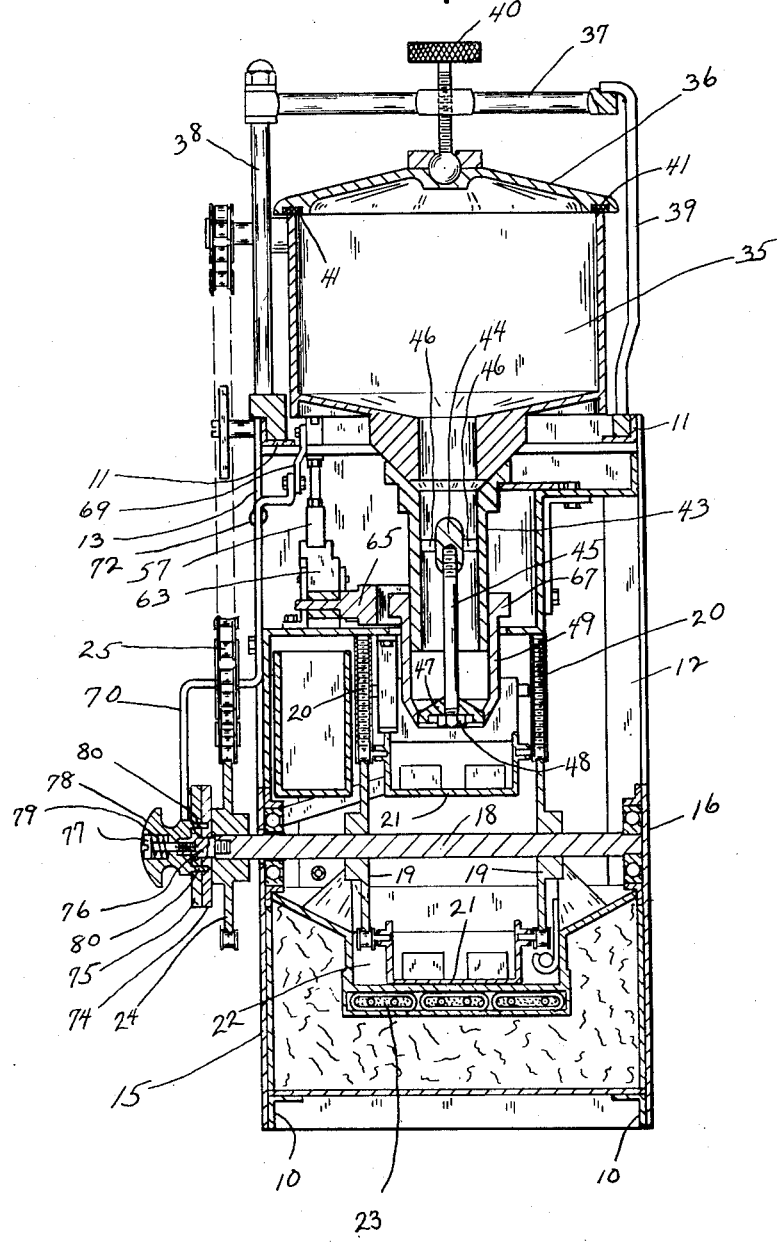

Dec. 12, 1933.   J. T. RUCH   1,938,863
PRODUCTION CONTROL FOR DOUGHNUT MACHINES AND THE LIKE
Filed July 21, 1932   3 Sheets-Sheet 3

INVENTOR.
JULIUS T. RUCH
BY
Lockwood Lockwood Gollsmith & Galt
ATTORNEYS.

Patented Dec. 12, 1933

1,938,863

UNITED STATES PATENT OFFICE 1,938,863

PRODUCTION CONTROL FOR DOUGHNUT MACHINES AND THE LIKE

Julius T. Ruch, Logansport, Ind.

Application July 21, 1932. Serial No. 623,770

9 Claims. (Cl. 107—4)

This invention relates to a production control for automatic cooking machines for use in making doughnuts and the like. While it is particularly applicable to the manufacture of doughnuts, it is equally useful in the production of potato chips, fried nuts and other comestibles which may be cooked by automatic machinery.

In the use of automatic machinery for the manufacture of doughnuts, there are two principal advantages. The first is the economy of labor and the second is the advertising value. The use of an automatic doughnut cooking machine in plain sight of possible customers attracts attention and also shows the customers that the product they are getting is freshly made on the spot. With the type of doughnut machines heretofore on the market, however, there has been no flexibility in the production rate of a given machine, the machines, in order to provide for maximum sales, ordinarily making more doughnuts in a given time than can be sold in a single shop at the average rate of sale. This results in the machine being shut down for a large percentage of the time when the sale of doughnuts is relatively slack. In this manner the advertising value is largely lost. It is impossible in this type of machine to regulate the rate of production by simply slowing down the movement of the working parts since each doughnut requires a given length of time for cooking, no matter how many are cooked per hour. To slow down the movement of the machine would result in longer cooking of each doughnut.

The principal object of the present invention is to provide a production control for such a machine by means of which a larger or smaller number of doughnuts or the like may be cooked in a given time, depending upon the sales demand, while the time of cooking of the individual doughnuts is the same for large or small productions. This object is attained by regulating the intervals at which raw materials are supplied to the cooking machine without changing the rate of travel of the articles to be cooked through the machine when once supplied thereto. In a doughnut machine of the type disclosed in my copending application Serial No. 618,825, filed June 23, 1932 in which doughnuts are carried through a vat of hot grease in separate containers, this result is accomplished by regulating the mechanism supplying dough to the containers so that certain of the containers will be left empty when a smaller production is required while all of the containers will be filled when a maximum production is required. A selective control is provided by means of which a greater or less number of the containers may be filled as desired. In other types of doughnut machines and in machines for the cooking of other products, the mechanism for supplying the raw material is similarly controlled.

Figure 5:
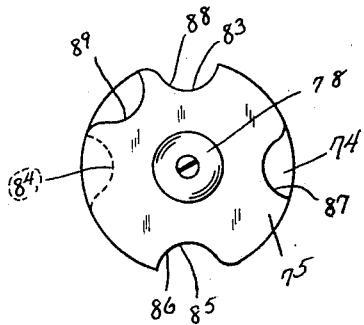
Figure 6:
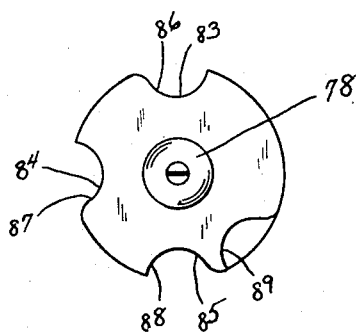
Figure 7:
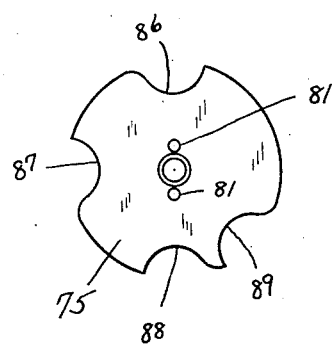
Figure 8:
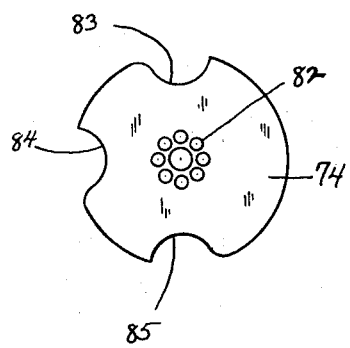

Other objects and features of the invention will be understood from the accompanying drawings and the following description and claims:

Figure 1 is an elevational view with parts removed of one end of a doughnut machine having the invention applied thereto. Figure 2 is a fragmentary view of certain of the parts of Figure 1 at a different point in the cycle of operation. Figure 3 is a sectional view taken on the line 3—3 of Figure 1. Figure 4 is an elevational view of a composite cam used in the production control and shows the same in position for maximum production. Figure 5 is a view of the same parts set for 50% production. Figure 6 is a view of the same parts set for 25% production. Figures 7 and 8 are elevational views of component parts of the composite cam.

The frame of the doughnut machine herein illustrated by way of example includes horizontal members 10 and 11, vertical members 12 and 13, front plates 14 and 15 and rear plate 16. A sheet of glass 17 is inset in the frame and permits a view of the interior of the machine.

A horizontal shaft 18 is supported on suitable bearings attached to the frame of the machine and carries a pair of sprockets 19 about which are trained a pair of chains 20 carrying doughnut receptacles 21. The said receptacles are pivotally mounted on the chains 20 and the said chains are arranged as shown in my copending application Serial No. 618,825, filed June 23, 1932 to conduct the receptacles through a reservoir 22 containing fat heated by electrical resistance elements 23 for cooking the doughnuts deposited therein. The shaft 18 also carries a sprocket 24 about which there is trained a chain 25 which is also trained about a sprocket 26 carried upon a pinion shaft 27 supported upon a gear housing 28 in turn mounted upon the top of the frame of the machine. The shaft 27 also carries a Geneva gear 29 which operates with a second Geneva gear 30 carried upon a shaft 31 also mounted upon the gear housing 28. The gear housing 28 also carries a horizontal shaft 32 having a pulley 33 thereon which is driven by a belt 34 by an electric motor or other suitable prime mover, not shown. Within the gear housing 28 the shafts 32 and 31 are connected by suitable reduction gears.

By means of this apparatus the shaft 31 is continuously rotated and through the Geneva gears intermittently rotates the shaft 27. The intermitten rotation of shaft 27 is transmitted to shaft 18 by the chain 25, and the receptacles 21 are thus intermittently moved along their path. The diameters of sprockets 24 and 26 and the Geneva gears 29 and 30 are so chosen that the shaft 18 makes a quarter revolution during each of its periods of movement.

A dough reservoir 35 is suitably mounted on the frame of the machine and has a cover 36 held in place thereon by means of a clamp consisting of a cross bar 37, vertical rods 38 and 39 and a clamp screw 40 threadedly engaging the rod 37 and operating, when tightened, to clamp the cover 36 upon the reservoir 35. The cover 36 is provided with a recess in which there is placed a packing ring 41 for making an air-tight seal with the body of the reservoir 35. A pipe connection 42 to the reservoir cover is connected to any suitable source of compressed air to maintain the reservoir under air pressure.

The reservoir 35 is provided with a downwardly extending nozzle outlet 43 having a bridge 44 therein supporting a vertical stem 45. The bridge 44 is provided with openings 46 for the passage of the dough. The stem 45 carries at its lower end a core 47 which is maintained in position by a nut 48 threadedly engaging the lower end of the stem 45. A sleeve 49 is slidably mounted upon the nozzle 43 and is normally positioned with its lower end engaging the outer surface of the core 47. It thus normally prevents the exit of dough from the reservoir 35. When upwardly moved, however, the said sleeve becomes disengaged from the core 47 and permits a ring of dough to be discharged about the core by the air pressure in the reservoir 35. This operation of the sleeve 49 is accomplished by mechanism to be hereinafter described which is timed to operate when a doughnut receptacle 21 has been stopped beneath the discharge nozzle 43 by the stopping of the rotation of shaft 18 in its intermittent movement.

For the operation of the sleeve 49 there is provided on the shaft 31 a cam 50 having in the rearward face thereof a groove 51. A roller 52 carried on one end of a lever 53 travels in groove 51. The lever 53 is pivotally mounted upon the frame of the machine at 54 and at its opposite end, carries a pin 55 engaging a slotted opening 56 in the upper end of a vertical link 57. The pin 55 also rotatably carries a cam 58, the outer surface of which normally engages a pin 59 carried by the link 57. The cam 58, however, is provided with a slot 60 so positioned that when the cam is thrown to the right, referring to Figures 1 and 2, the pin 59 may pass through the slot 60. By this construction, when the cam 58 is in the position shown in the drawings, the link 57 may be forced downwardly by the lever 53. If the cam 58, however, is thrown to the right, the pin 59 travels in the slot 60 and the pin 55 travels in slot 56 so that no movement of the link 57 results from the movement of the lever 53.

The lower end of the link 57 is provided with a notch 61 normally engaging a pin 62 carried by a lever 63 which is pivotally mounted at 64 on the frame of the machine. The opposite end of the lever 63 is pivotally connected to a yoke 65 in turn connected by a pin 66 to a flange 67 formed on the upper end of the sleeve 49. The groove 51 in the cam 50 is provided with a portion 68 which approaches the axis of the cam closer than the remainder of the groove. When the cam 50 has been rotated to bring this portion into engagement with the roller 52, the lever 53 is rocked to force the link 57 downwardly. When the said link is in the position shown in Figure 1, engaging the pin 62, the lever 63 is rocked to elevate the sleeve 49 to permit the formation of a doughnut. When the link 57 is in the position shown in Figure 2, disengaged from the pin 62, the movement of lever 53 causes no movement of the sleeve 49 and no doughnut is formed.

For moving the link 57 into and out of engagement with the pin 62, a link 69 is attached thereto. The said link is pivotally attached to the upper end of a lever 70 which is in turn pivotally mounted at 71 upon the frame of the machine. A tension spring 72 is connected to the upper end of said lever and to the frame member 13 and normally urges the link 69 to the left, referring to Figures 1 and 2, to disconnect the link 57 from the pin 62. The lower end of the lever 70 carries a roller 73 which engages the surface of a composite cam consisting of two cam discs 74 and 75. The disc 74 is fixedly mounted on a stud 76 fastened to the end of the shaft 18, while the disc 75 is rotatably mounted on the same stud. The stud 76 carries a screw 77 upon which there is slidably and rotatably mounted a knob 78. A compression spring 79 is inset in the knob 78 and abuts against the head of the screw 77 normally forcing the knob inwardly toward the machine. The knob 78 is provided with a pair of pins 80 engaging holes 81 in the disc 75 and holes 82 in the disc 74. The disc 74 is provided with three notches 83, 84 and 85 in its periphery, the said notches being placed as shown in Figure 8, at intervals of 90°. The disc 75 is provided with three similar notches 86, 87 and 88 similarly placed and with a fourth notch 89 at 45° from the notch 88.

By pulling the knob 89 toward the left in Figure 3, against the action of the spring 79, the pins 80 may be withdrawn from the holes 82 in disc 74 but not from the holes in disc 75. When so withdrawn, rotation of the knob rotates the disc 75 to a new position and the pins 80 may be inserted in a new pair of the holes 82. As shown in Figure 8, the holes 82 are eight in number which permits the disc 75 to be placed in eight different positions, each at 45° from the adjacent position. By means of this movement of the disc 75, a larger or smaller number of the notches in said disc may be brought into coincidence with the similar notches in the disc 74.

When the discs are set as shown in Figure 4, none of the notches in disc 75 coincide with the notches 74. The composite cam therefore presents a completely circular surface to the roller 73 and the lever 70 is always held in position to draw the link 57 into engagement with the pin 62. In this position, the sleeve 49 is operated to produce a doughnut at each stop of the conveyor chains 20 and each of the receptacles 21 is supplied with the raw material for a doughnut. The machine thus operates at 100% capacity.

When the disc 75 is moved to the position shown in Figure 2, the notch 89 therein coincides with the notch 85 in the disc 74, while the remainder of the notches on disc 75 do not coincide with the notches in disc 74. The composite cam therefore, presents to the roller 73 a surface having a single notch therein. When the roller 73 engages the said notch, the spring 72 draws the lever 70 into the position shown in Figure 2 and disengages the link 57 from the pin 62. Therefore, no doughnut will be formed at this position of the apparatus. Since the shaft 18 rotates a quarter revolution for each step of the receptacles 21, one receptacle in four will not receive a doughnut and the machine, therefore, operates at 75% capacity.

When the disc 75 is moved to the position shown in Figure 5, the notches 86 and 88 therein coincide respectively with the notches 85 and 83 in the disc 74. Therefore, in two of the positions out of each four, the sleeve 49 will not be operated to form a doughnut and the machine will operate at 50% capacity.

When the disc 75 is placed as shown in Figure 6, the notches 86, 87 and 88 therein coincide respectively with the notches 83, 84 and 85 in disc 74. Three notches are thereby formed in the periphery of the composite cam. At three stops out of each four, the sleeve 49 will not be operated to produce a doughnut. The machine, therefore, operates at 25% capacity.

When it is desired to stop production entirely but to complete the cooking of doughnuts already in the receptacles, the cam 58 is thrown to the right to permit movement of pin 59 in slot 60 and of pin 55 in slot 56. The sleeve 49 is therefore not moved to produce a doughnut at any time in the cycle of operation, although the chains 20 and receptacles 21 continue their normal intermittent movement.

While the foregoing specification describes the invention in a preferred form attached to a specific type of doughnut machine, it is evident that the same may be applied to other forms of doughnut machines in which the dough is intermittently supplied, such as, for example, the machine shown in Bergner Patent No. 1,492,542, issued April 29, 1924. The invention may also be applied to machines for cooking other comestibles wherever the raw material is intermittently supplied.

The invention claimed is:

1. In a cooking machine, the combination of mechanism for feeding raw material to be cooked, a movable member normally operatively connected to said mechanism for operating the same to feed raw material when said member is moved, means for periodically moving said member, and selective means for disconnecting said member from said feeding mechanism during a predetermined percentage of the periods of movement thereof.

2. In a cooking machine, the combination of mechanism for feeding raw material to be cooked, a lever connected to said mechanism for operating the same to feed raw material, a link normally connected to said lever, power operated means for periodically moving said link, and selective means for disconnecting said lever and link during a predetermined percentage of the periods of movement of said link.

3. In a cooking machine, the combination of mechanism for feeding raw material to be cooked, a lever connected to said mechanism for operating the same to feed raw material, a link normally connected to said lever, power operated means for periodically moving said link, a cam movable by said power means, a cam follower riding upon the operating surface of said cam and connected to said link for disconnecting the same from said lever, and means for selectively changing the form of the operating surface of the cam to cause said link and lever to be disconnected during a predetermined percentage of the periods of movement of said link, said surface normally being such as to maintain continuously said link and lever connection.

4. In a cooking machine, the combination of mechanism for feeding raw material to be cooked, a movable member normally operatively connected to said mechanism for operating the same to feed raw material when said member is moved, means for periodically moving said member, and cam mechanism for connecting and disconnecting said movable member and said feeding mechanism, said cam mechanism including a cam having an operating surface of variable form by means of which said member and feed mechanism may be connected or disconnected during a greater or less percentage of the periods of movement of said member.

5. In a cooking machine, the combination of mechanism for feeding raw material in successive batches, apparatus normally operable to actuate said mechanism at predetermined time periods, and cam mechanism for connecting and disconnecting said actuating apparatus and said feeding mechanism, said cam mechanism including a cam having an operating surface of variable form by means of which said actuating apparatus and said feeding mechanism may be connected or disconnected during a greater or less percentage of the operating periods of said actuating apparatus.

6. In a cooking machine, the combination of mechanism normally operable to feed raw material at predetermined time periods, and cam mechanism for automatically rendering said mechanism inoperative at a predetermined percentage of said time periods, said cam mechanism including a cam having an operating surface of variable form by means of which said predetermined percentage may be increased and decreased.

7. In a cooking machine, the combination of mechanism for feeding raw material in successive batches, appartus normally operable to actuate said mechanism at predetermined time periods, and cam mechanism for automatically disconnecting said actuating apparatus from said feeding mechanism at a predetermined percentage of its normal operating periods, said cam mechanism including a composite cam comprising a pair of cam discs having notches in their periphery and being relatively adjustable with respect to each other to bring a greater or less number of said notches in one of said discs into coincidence with notches in the other of said discs, and a cam follower of sufficient width to engage the edges of both of said discs, said follower being moved to disconnect said actuating apparatus from said feeding mechanism only when it engages coinciding notches on both discs.

8. In a cooking machine, the combination of a plurality of relatively movable receptacles adapted to carry material through a cooking cycle, mechanism normally operable to supply raw material to each of said receptacles, and selective means for automatically rendering said mechanism operative to fill only a predetermined percentage of said receptacles.

9. In a cooking machine, the combination of mechanism operable to feed batches of raw material, and cam operated mechanism for controlling the rate of supply of said batches, said mechanism including a cam having an operating surface of variable form by variation of which said rate may be increased and decreased.

JULIUS T. RUCH.